UNITED STATES PATENT OFFICE.

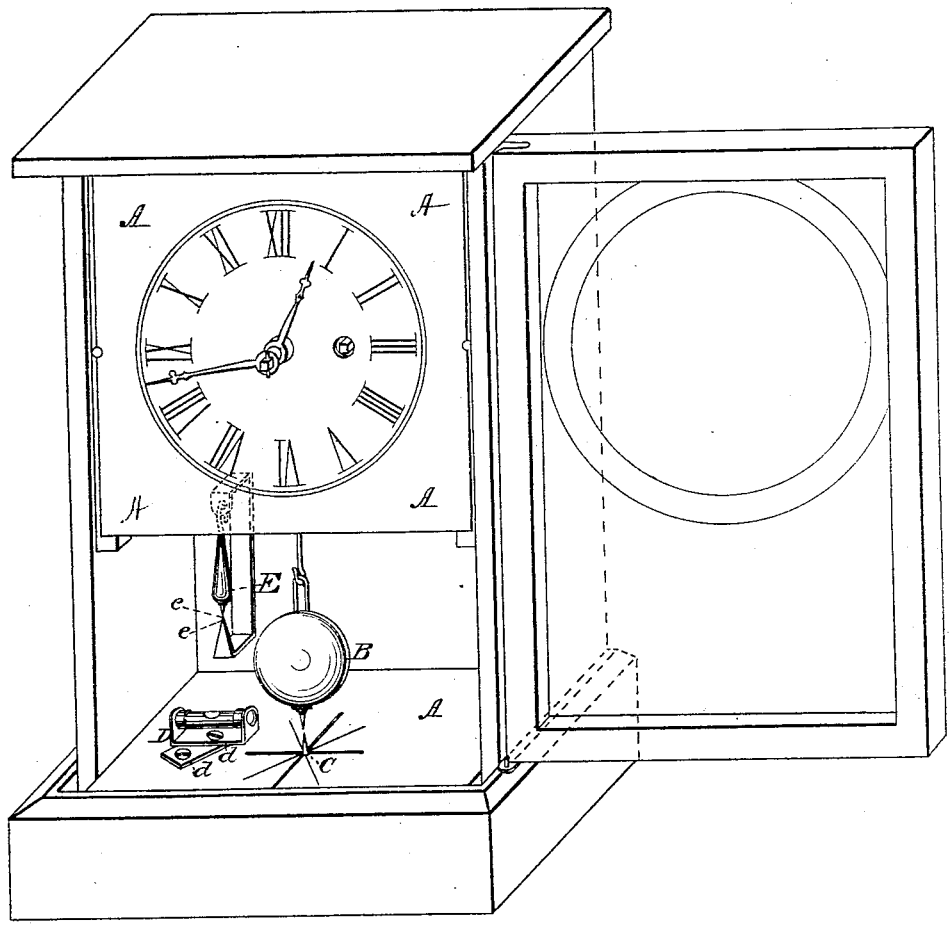

J. F. KEELER, OF CLEVELAND, OHIO.

DEVICE FOR ADJUSTING CLOCKS VERTICALLY.

Specification of Letters Patent No. 28,088, dated May 1, 1860.

*To all whom it may concern:*

Be it known that I, J. F. KEELER, of Cleveland, in the county of Cuyahoga and State of Ohio, have invented a new and Improved Mode of Constructing Clocks; and I do declare that the following is a full and exact description thereof, reference being had to the accompanying drawings and letters of reference marked thereon.

The nature of my invention consists in affixing to a clock a device for showing when the clock is level or "in beat," or if out of level, in which direction it is out of level.

In the accompanying drawings forming a part of this specification A, A, A, A, represent an ordinary clock with its frame, including the door &c.

B, represents the pendulum of the clock.

C, represents an index placed (usually on the upper side of the bottom of the frame,) so as to be directly under the pendulum when the clock is level or "in beat."

D, represents a revolving or universal spirit level, so made that it can be turned in any horizontal direction on the loose-fitting screws *d, d*, and is so adjusted as to show the clock to be level, when in beat.

E, represents an ordinary plumb line with two indices *e, e*, so arranged that when the clock is in beat, the indices will point directly toward each other.

By the application and arrangement of the devices herein described, or either of them, a clock may have its proper position for correct beat designated by one having experience and skill therein at the clock manufactory, or elsewhere, and the purchaser, or user, of the clock has only to set or place it as these devices, or either of them, whichever may be most convenient (depending on the peculiar condition of the clock) shall indicate, and the clock will be in beat and therefore more likely not only to keep correct time, but also to keep in motion, as if much out of beat, the clock will soon stop. The directions to set the clock level usually accompanying clocks, have hitherto failed, in efficiency, because the clocks contained nothing in themselves to show when they were level, and because it is not always true that a clock is properly in beat when its frame is in a level position.

I claim—

In the construction of clocks, the use of the plumb line, the spirit level, or the index under the pendulum, either or any of them, substantially in the manner and for the purpose herein set forth.

J. F. KEELER.

Witnesses:
J. R. REED,
GEO. M. REED.